United States Patent
McGinness (10) Patent No.: US 7,029,589 B2
(45) Date of Patent: Apr. 18, 2006

(54) UNIVERSAL METHOD AND APPARATUS FOR CONVERSION OF VOLATILE COMPOUNDS

(76) Inventor: Michael P. McGinness, P.O. Box 513, South Houston, TX (US) 77587

( * ) Notice: Subject to any disclaimer, the term of this patent is extended or adjusted under 35 U.S.C. 154(b) by 170 days.

(21) Appl. No.: 10/240,987

(22) PCT Filed: Apr. 4, 2001

(86) PCT No.: PCT/US01/11464

§ 371 (c)(1),
(2), (4) Date: Oct. 4, 2002

(87) PCT Pub. No.: WO01/74471

PCT Pub. Date: Oct. 11, 2001

(65) Prior Publication Data

US 2003/0047521 A1   Mar. 13, 2003

Related U.S. Application Data (60) Provisional application No. 60/194,445, filed on Apr. 4, 2000.

(51) Int. Cl.
*C02F 1/00* (2006.01)
(52) U.S. Cl. .................. 210/758; 210/759; 210/760; 210/906; 210/908; 210/930; 95/42; 95/149; 95/228; 95/229
(58) Field of Classification Search ............... 210/601, 210/750, 758, 759, 760, 906, 908, 930; 95/42, 95/149, 228, 229
See application file for complete search history.

(56) References Cited

U.S. PATENT DOCUMENTS

| | | | |
|---|---|---|---|
| 4,496,371 A * | 1/1985 | Urban et al. ................. | 95/174 |
| 4,689,154 A | 8/1987 | Zimberg | |
| 4,861,484 A | 8/1989 | Lichtin et al. | |
| 5,279,963 A | 1/1994 | Hobby | |
| 5,316,684 A | 5/1994 | Morico | |
| 5,914,040 A | 6/1999 | Pescher et al. | |
| 6,019,548 A | 2/2000 | Hoag et al. | |
| 6,656,249 B1 * | 12/2003 | Buisman et al. ............. | 95/195 |

* cited by examiner

*Primary Examiner*—Betsy Morrison Hoey (57) ABSTRACT

A method or process of treating a contaminated fluid (10) having at least one contaminant having a property selected from the group consisting of being volatile, hazardous, tacky and a combination thereof is provided. The method comprises contacting the contaminated fluid with an effective amount of an agent (12) selected from oxidizing agents, free radical producing agents and a combination thereof for an effective amount of time to convert a substantial amount of the at least one contaminant to at least one corresponding modified contaminant having a property selected from the group consisting of being non-volatile, less volatile than the converted contaminant non-hazardous, less hazardous than the converted contaminant, non-tacky and a combination thereof; and generating a treated fluid (14) having a level of the at least one contaminant and of the at least one corresponding modified contaminant to allow the treated fluid to at least meet requirements for release, reuse or further treatment.

32 Claims, 4 Drawing Sheets

UNIVERSAL METHOD AND APPARATUS FOR CONVERSION OF VOLATILE COMPOUNDS

This application claims the benefit of Provisional Application No. 60/194,445, filed Apr. 4, 2000.

BACKGROUND OF THE INVENTION

1. Field of the Invention

The present invention relates to a method and apparatus to control and limit the emission and discharge of volatile and malodorous contaminants, such as those identified as VCs, VOCs, VICs, $NO_x$, $SO_x$, MCs, HAPs and other regulated contaminants, 2. Description of Prior Art Numerous compounds used in various industries are recognized as environmental health hazards and pollutants. Regulatory control in the United States and other countries has led to constantly increasing restrictions on discharge of such contaminants. While various separation and destruction methods have been utilized to remove contaminants from those waste products requiring disposal, many of the methods utilized are prohibitively expensive, especially for small facilities with limited resources. Low concentration high volume flows carry large energy and power penalties when treated with conventional technologies, and contribute to green house gas problems. Many small emission sources remain uncontrolled due to the prohibitive cost of installing and operating conventional systems.

Air contaminants are produced by many industries in many forms. Some industries produce Volatile Contaminants (VCs), Hazardous Air Pollutants (HAPs), or Malodorous Compounds (MCs) as part of a waste gas stream. Many industrial processes are dependent on evaporative processes that contaminate fluid process flows with VCs, HAPs, or MCs. In other industries, the contaminants are absorbed into a liquid solvent making the solvent unfit for further use. Contaminants may be entrained as a result of a scrubber process, or as a result of a processing of other materials. These contaminants can be present in liquid or gas streams depending on the industry or the source. VOCs are also found in contaminated ground water and soil. Such occurrences lead to the need for remediation.

Regulations on air quality affect a wide variety of industries. The Federal Clean Air Act (FCAA) applies to air emissions establishing air quality standards, emission standards for hazardous air pollutants, new source performance standards, acid deposition limits, and particulate discharge emission limits. The Federal Clean Water Act (FCWA) addresses control of pollutants to the environment through liquid discharge. Hydrocarbon and petrochemical industries are affected by these restrictions. Industries that burn fossil fuels, such as for power generation, are also affected by these emission limits. From paint shops and bakeries to dry cleaners, there is a need for a method and apparatus to dispose or destroy these contaminants. Such treatment methods must operate in an efficient and cost-effective manner without producing new pollutants or depleting valuable resources.

One of the methods currently available for handling contaminants is equilibrium distillation. To achieve high purity products requires an increased number of stages, increased energy input to increase reflux and/or vessels designed for non-atmospheric pressure operation. When multiple solvents are combined prior to being regenerated, close relative volatilities and azeotropes can make equilibrium separation particularly difficult. While solvent can be recovered by this method, some solvent is typically lost to the contaminant by-product. Furthermore, while the major portion of contaminants may be concentrated in one by-product, the contaminant remains essentially in the same form and thus requires further treatment to complete disposal or destruction of the contaminant. These methods simply concentrate the contaminants that must then go to disposal or further treatment and separation steps.

Numerous filtration methods have also been utilized including ultrafiltration techniques. Various entrained solids or filter aids have been tried including activated carbons, titanium oxides, aluminas, iron oxides and silicas. Filter media with contaminants then face the same disposal challenge since the contaminants are trapped within the media.

Destruction techniques involve subjecting the contaminants to extreme thermal conditions such that the contaminants are broken down into simpler components, such as $CO_2$, $H_2O$ and even elemental components. Destruction techniques typically involve large additional energy inputs and substantial space requirements. This combination is often economically inefficient for significant volumes of throughput and wastes limited hydrocarbon resources. Available destruction techniques include thermal oxidation, incineration, and catalytic incineration/oxidation. Incineration, i.e., oxidative destruction, seeks to oxidize the contaminants to produce primarily $CO_2$ and $H_2O$. Notably, the release of $CO_2$ is also becoming regulated as a greenhouse gas and may soon have limits placed on its discharge. Particulate matter tends to negatively affect some incineration processes as well as release particulate matter that contributes to ground level ozone (smog) formation.

Thermal oxidation works on the principle of an afterburner. The heat energy required to reach combustion temperatures is typically supplied by the oxidation of the contaminants in the more efficient systems. However, when only low concentrations of the contaminant are available, large amounts of energy must be added to the effluent stream to reach the required temperature to destroy the contaminants. In addition to creating thermal pollution and green house gases, it makes thermal oxidation inefficient and cost prohibitive.

Disposal of liquid and/or solid wastes containing these contaminants is also costly. It is desirable to treat hazardous contaminants using chemical reactions where the contaminant is converted to a non-hazardous or sometimes even useful reusable material. One specific example of this includes the decomposition of volatile organic halogenated compounds (VOHC) by passing the compound through a porous silica gel bed and exposing the gel to ultraviolet light and/or ozone. Some of the difficulties involved with this technology include the expense and difficulties of maintaining and regenerating the silica gel bed, particularly as the bed tends to foul when particulate matter is introduced in the stream to be treated. Another specific example of such reaction includes the destruction of perchlorethylene (PERC) in the dry cleaning industry by "burning up" the PERC using ozone. Both of the above methods require substantial amounts of ozone to achieve their goals. Furthermore, the use of ozone or other oxidizing agents for complete destruction requires the use of an amount stoichiometrically determined to completely convert the amount of contaminants available to $H_2O$, $CO_2$, and HCl. A very large amount of excess (i.e., beyond stoichiometric requirements) ozone or oxidizing agent is also consumed by other oxidizable materials present in the matrix. Even more ozone is catalytically converted back to $O_2$ by reaction with itself, or wasted as an offgas to a destruction device that converts $O_3$ back to $O_2$. Ozone is undesirable as an off-gas. Additional steps become necessary to remove excess ozone. It is recognized that continued exposure to levels of ozone as low as 0.00010% are toxic. This can result in ozone or oxidant feed requirements that are 10 to 100 times the stoichiometric requirement.

Other available methods of removing contaminants from gases include liquid absorbent scrubbers. Liquid scrubbers contact the airborne contaminants with mist or fog that absorb or otherwise capture the contaminant in the gas or air stream and remove it from the stream. The air stream can then be safely vented to the atmosphere. All scrubbing liquids have a limit to the amount of contaminants they can absorb or carry. Once the scrubbing liquid's capacity has been reached, the liquid must be regenerated or discarded. Liquid scrubbers also frequently require expensive additives, such as metal chelates, defoamers, pH additives, reactive agents or other specialty chemicals. Scrubbing liquids are frequently selective to specific contaminants making them impractical for systems containing multiple contaminants.

Many industries have similar problems with treatment or disposal of contaminants from waste products. The paint and coating industry is particularly plagued with problems due to the nature of the paints and coatings they use and produce. Many consumer and industrial items require coatings on the product. Such coatings are typically applied in a paint spray booth. A wide variety of coatings are in use today including latexes, lacquers, varnishes, enamels, epoxies, polyurethanes, catalyzed coatings, metal-containing paints, and many more. These coatings can be either oil based, solvent based, water based, solvent water emulsion based, or high solids catalyzed based (where the monomer acts as its own solvent for viscosity control). A paint spray booth is an enclosed ventilated area in which materials are sprayed or coated. As coating operations typically involve excess oversprayed paint and solvent vapors from the painting operation, the paint spray booth is intended to capture the overspray while diluting the solvent vapors well below the lower explosive limit as they are collected and exhausted from the booth.

In water wash spray booths, forced air is used to direct the flow of over-spray to a water wash chamber. The over-spray particulate contaminants are trapped in the water wash scrubber section of the booth allowing the cleaned air to be vented or further processed. The water wash solution is typically fresh water with various chemicals added to defoam, detackify and flocculate the collected over-spray. One popular water wash booth solution is an oil-in-water emulsion. This emulsion solution is particularly effective at capturing a wide variety of paints in a paint spray booth. Various organic and synthetic oil systems are also used in liquid scrubbers but have not found favor in the paint booth scrubber application due to their cost and various recycling problems.

Peculiar to paint spray booths (as opposed to many other scrubber applications) is the issue that the paint hardens or becomes tacky and sticky as solvent evaporates from the previously captured paint particles. Paints that contact surfaces of the booth scrubber section create a film that grows thicker as deposits build up on the surface. Paint collected in air filters or in a wash section that is subjected to heat or drying becomes tacky. This causes, a problem in every aspect of paint booth operation, from the cleaning of equipment, walls and tanks to the further processing of removed sludge and solids. Water wash paint booths typically capture the particulate contaminants in a suitable liquid material (usually water) by contacting the liquid with the contaminants. Various chemicals are added to these liquids to provide detackifying properties. The addition of detackifying chemistry and flocculation chemistry increases the final sludge volume requiring disposal by up to 300–400%. These chemical additions are expensive in that they are costly to buy, require bath titrations and calculations to determine the correct amount and frequency of addition needed to maintain the booth, and increase the final disposal volume and cost by up to 400%. Since most industrial operations, including manufacturers, do some painting, the problems associated with painting operations are widespread.

The paint industry also produces paint sludge and substantial quantities of unused paint that must be discarded. Currently, sludge from existing water wash paint booths, and sludges from other industries that contain hazardous organic ingredients, solvents or metals, require very special and costly treatment. Separation of hazardous waste metals, water and organics from various waste streams that vary substantially from batch to batch make separation process scaleups nearly impossible to consider. Premium disposal rates are charge for organic sludges with heavy metal (hazardous) contamination that have low BTU value due to water content. There is a need for a method of converting high-concentration paint waste and sludge-like products with and without excess water content into useful or non-hazardous materials or by-products.

Manufactured items must first be cleaned in order to assure good adhesion of the paint to the item. Manufactured components must be cleaned of fabrication process surface contaminants such as fabrication oil, metal fines, shop dirt, dust and hand prints (oil). These contaminants are typically removed with a cleaning fluid. When the cleaning fluid becomes saturated with contaminants, it must either be reconditioned or discarded. Reconditioning typically includes separation of the contaminants from the fluids so that the fluids can be re-used. The contaminants are then merely in a concentrated form and still require disposal.

There is a need for a universal method and apparatus that addresses air pollution control and water pollution control such universal method being applicable to treat volatile contaminants produced by a variety of processes sources.

There is a need for a method and apparatus for converting hazardous, volatile and/or malodorous compounds into non-hazardous, less hazardous, non-volatile, less volatile, odorless and/or useful compounds.

There is a need for a method and an apparatus for cost-effective treatment of waste streams containing contaminants.

There is a need for a method of treating streams containing contaminants such that the contaminants are converted from hazardous to non-hazardous or less hazardous components.

There is a need for a method of oxidizing such contaminants involving substantially reduced amounts of oxidizing reagent.

There is a need for an air pollution control process and apparatus that can efficiently treat streams with low concentrations of contaminants.

There is a need for air pollution control processes that do not produce additional waste streams or waste products as a result of the pollution control process.

There is a need for a method and apparatus for the destruction or ultimate disposal of multiple and/or mixed environmental contaminants.

There is a need for a liquid-scrubbing process and apparatus that minimizes the cost of or need to regenerate the scrubbing liquid.

There is a need for a method and apparatus for detackifying scrubber liquids, sludges and the like.

There is a need for a method and apparatus for improving the filterability of scrubber liquids, sludges and the like.

SUMMARY OF THE INVENTION

The present invention encompasses a universal method and apparatus for removal and treatment of volatile, hazardous (including toxic) and/or malodorous contaminants by converting the contaminants into non-volatile, less volatile, non-hazardous, less hazardous, odorless, odor-pleasant and/or useful materials. Volatile contaminants or potential volatile contaminants can be present in gas streams or in liquid streams. These contaminants may include those contaminants categorized as volatile organic compounds (VOCs), volatile inorganic compounds (VICs), malodorous compounds (MCs) and other air contaminants such as $NO_x$s and $SO_x$s that through chemical reaction may be made water soluble, odorless or odor-pleasant, or otherwise non-volatile or less volatile. VICs include a variety of volatile inorganic components including inorganic siloxane solvents, newly introduced into commerce as substitutes for VOCs, HAPs, malodorous compounds and ozone depleting solvents used in the various manufacturing industries.

The present invention is universal in that it can be applied to modify contaminants regardless of the phase of the carrier fluid, the volume of the contaminated stream, the mixtures of contaminants, or the concentrations of contaminants. This makes the invention applicable across all industries that produce harmful volatile contaminants, hazardous waste, and malodorous contaminants.

A method or process of treating a contaminated fluid having at least one contaminant having a property selected from the group consisting of being volatile, hazardous, tacky and a combination thereof is provided. The method comprises contacting the contaminated fluid with an effective amount of an agent selected from oxidizing agents, free radical producing agents and a combination thereof for an effective amount of time to convert a substantial amount of the at least one contaminant to at least one corresponding modified contaminant having a property selected from the group consisting of being non-volatile, less volatile than the contaminant, non-hazardous, less hazardous than the contaminant, non-tacky and a combination thereof, and generating a treated fluid having a level of the at least one contaminant and of the at least one corresponding modified contaminant to allow the treated fluid to at least meet requirements for release, reuse or further treatment.

The method may further comprise contacting a contaminated off-gas containing the at least one contaminant with a contacting liquid to remove at least a substantial portion of the at least one contaminant from the contaminated off-gas generating a treated off-gas and the contaminated fluid. The contaminated off-gas may be cooled prior to or during the contacting with the contacting liquid to at least partially condense a portion of the at least one contaminant to facilitate removal thereof by the contacting liquid. A portion or all of the treated liquid may be recycled to the contacting liquid.

The method may further comprise stripping volatile contaminants from a contaminated liquid stream by contacting the contaminated liquid stream with a stripping stream to generate a treated liquid stream and the contaminated off-gas.

The method may be used with phosphating bath liquid. A preferred agent is the use of ozone. Ozone reacts with water to form peroxides that accelerate phosphate coating formation. The ozone and water may be mixed prior to contacting the phosphating bath liquid. The ozone is preferably added in an effective amount to also act as a phosphate-coating accelerator, a secondary phosphate-coating accelerator compound producer, phosphate-coating accelerator compound regenerator or combination thereof therein.

Figures 1, 2, 3:
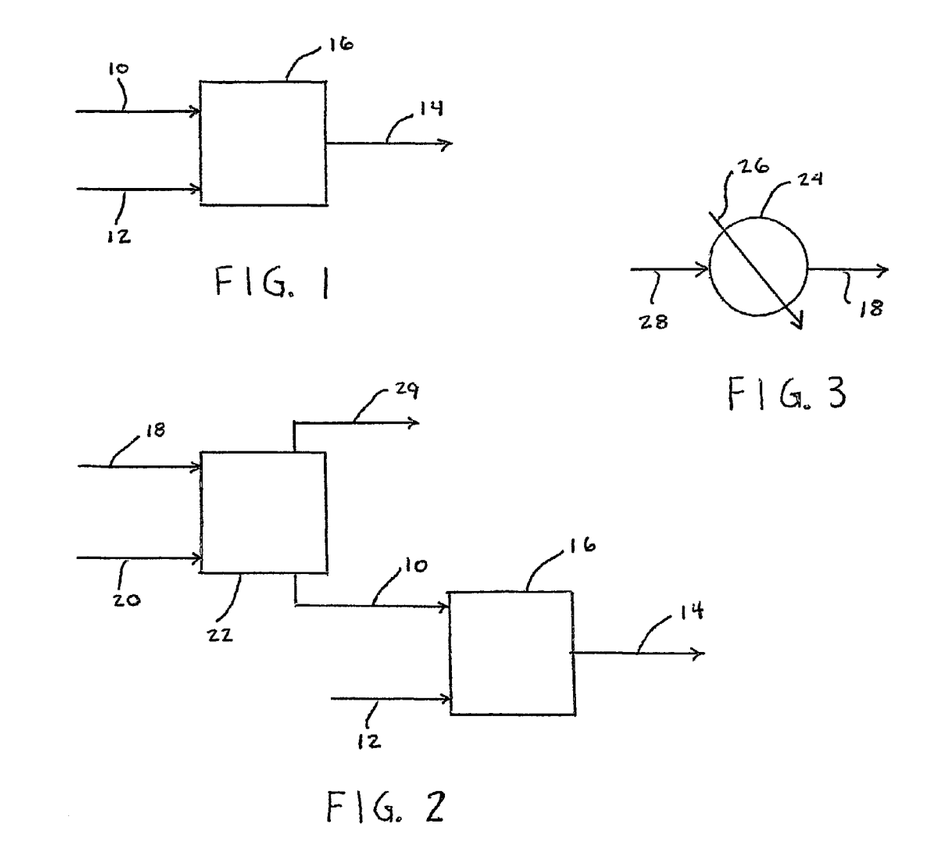
FIG. 1 is a flow schematic of an embodiment of the present invention.
FIG. 2 is a flow schematic of another embodiment of the present invention.
FIG. 3 is a flow schematic of a heat exchanger used in the present invention.

In view of the varied sources of contaminated fluids, the methods of the present invention may be integrated into such processes to provide treatment of such contaminated fluids. Accordingly, in a main process that utilizes a contacting gas and generates at least one main off-gas containing a contaminant, the process according to the present invention, for example, as shown in FIG. 2 may be used to treat such main off-gas as a contaminated off-gas. When there is a plurality of main off-gas streams, the plurality of main off-gas streams are combined to form the contaminated off-gas. Additionally, at least a portion of the treated off-gas may be recycled to the main process as part of or as the contacting gas.

Further, in a main process that utilizes a contacting liquid and generates at least one main liquid containing a contaminant, the process according to the present invention, for example, as shown in FIG. 1, may be used to treat such main liquid as a contaminated fluid. When there is a plurality of main liquid streams, the plurality of main liquid streams are combined to form the contaminated fluid. Additionally, at least a portion of the treated fluid may be recycled to the main process as part of or as the contacting liquid. In another embodiment, only a minor portion of the at least one main liquid is provided as a slip-stream for treatment. This allows for a more continuous operation of the main process.

One embodiment of the invention includes a liquid/gas scrubber or contactor such that the agent (an oxygenation agent) is introduced into a liquid carrying the contaminants where the oxygenation agent chemically alters the contaminants by adding one or more oxygen atoms to the chemical structure of the contaminant. In this manner, the liquid does not become saturated with the contaminant thereby losing efficacy. The oxygenation agent is preferably introduced as a gas and in such quantity that partial oxidation, rather than complete oxidation, occurs. This converts non-biodegradable compounds into biodegradable compounds and volatile compounds into less volatile compounds and odor producing compounds into less volatile and/or odorless compounds. Thus, the liquid scrubber also acts as a reaction vessel reactive product absorber and/or condenser.

An alternate embodiment includes separate stages for the liquid/gas scrubber and the reactor stage with the oxygenation agent being added in the reactor stage. The reactor would be a combination stripper/reactor in this embodiment as opposed to the scrubber reactor embodiment described above. When the contaminants are already contained within a liquid, perhaps from a prior scrubber, contaminated ground water, or contaminated process water, or other fluid, then the contaminated liquid can be directed to the stripper/reactor stage. The stripper/reactor includes introduction of contaminated liquids into a reaction vessel where the volatile contaminant is first encouraged to shift (flash) to the gas phase where it is then partially oxygenated by reaction with ozone, oxygen or other oxygenating reagent. The amount of ozone or oxygenating reagent used is limited such that preferably only the volatile contaminants are reacted and converted to intermediate products. Said intermediate products include products that act as solvents, co-solvents, chelating agents, emulsifying agents (volatile contaminants in scrubber fluid emulsifying agents), scrubber fluid surface tension reducing agents, volatile contaminant volatility reducing agents, non-hazardous materials and/or biodegradable materials. Furthermore, said intermediate products, having substantially lower volatility and/or increased water solubility, shift back into the liquid phase via condensing and/or dissolving or absorbing in the liquid phase and exit the reactor with the treated fluid in the liquid phase.

One preferred embodiment includes treatment of water-wash-paint-booth-wash water. By introducing the water of the booth into the reactor of the invention, the contaminants are converted to intermediate products that enhance the scrubber solution used in the paint booth. The reactor can be integral with the stripper or can be a separate vessel. The regenerated solution can then be returned to the paint booth, fed to a bioreactor, discharged to a local POTW (Publicly Owned Treatment Works) for further treatment, a combination of these items or used in other ways. To avoid oversaturation of the wash water with intermediate products created by the oxygenation reaction, a slip-stream can be removed from the main wash water and treated such that the intermediate products are completely oxidized or the slip-stream can be removed to another location, such as bioreaction, for example, in a bioreactor that converts the organic components in the slip-stream into methane biogas in an anaerobic bioconversion or into fertilizer in an aerobic bioconversion. When the slip-stream is removed, makeup water solution is added to the wash water. Makeup water solution for the water wash booth can be bioreactor treated and filtered water that is subsequently returned to the water wash booth, fresh water feed, or used rinse water from a cleaning process rinse. A particularly desirable embodiment includes treating a slip-stream of the wash water solution in the stripper/reactor rather than the entire volume simultaneously. In this fashion, the stripper/reactor vessel size is substantially reduced along with minimizing capital and operating costs. The stripper/reactor can then function during times when the paint booth is not in use, in addition or in place of those times when the booth is in use. The ozone generator capacity requirements are also minimized, for example, at least by a factor of 10, in this fashion further reducing costs of regeneration.

The stripper/reactor of the invention is also applicable to the treatment of paint sludge and unused paint. These hazardous waste products can be diluted with water before introduction into the reactor and exposure to the oxygenation reagent. Partly for safety reasons, the added water acts as a thermal reaction rate regulator to minimize the possibility of a runaway reaction, which could pose a fire or explosion hazard. Paint sludge and unused paint treated in this fashion are rendered non-hazardous just like paint booth sludge from a water wash booth. There are many possible uses for the product of treated paint sludge and unused paint. Further processing includes filtration (which would not be possible if solution was still tacky) for recovery of valuable pigments such as titanium dioxide, treatment in a bioreactor to create a saleable product, such as fertilizer from an aerobic bioreactor or methane biogas from an anaerobic bioreactor, and other recovery options that will be specific to the type of valuable components initially used or mixed into the original paint, sludge or unused paint.

The reactor of the invention is also useful in treating cleaning and phosphate baths. Cleaning baths used in many industries, particularly where metal is cleaned prior to painting, accumulate the contaminants discussed above, oils, greases, solvents, metal fines, ionic metals and other soils. As described above, these cleaning solutions can be regenerated by oxygenation of the contaminants. Oxygenation creates a cleaning solution with additional surface active components thus increasing the specific emulsifying and soil carrying capacity of the cleaning solution. The reaction of the invention can take place in a separate vessel that receives all or part of the cleaning bath to be regenerated, or the vessel used for the bath itself can be used as the reactor, or as one of the reactors. Furthermore, this invention includes the addition of the oxygenation reagents (such as ozone) as phosphate coating accelerators for the pre-paint metal finishing process in the phosphate coating bath. Furthermore, this invention includes the addition of oxygenation reagents (such as ozone) that act as phosphate coating accelerator compound regenerators ($ClO_3$ regeneration, for example), and producers of secondary phosphate coating accelerator compounds such as peroxides and hydroxide free radicals. Since many of these phosphate coating processes are also parts cleaners (they contain wetting and cleaning agents to disperse any remaining soils in order to insure that a uniform phosphate coating is formed), the additional benefit of increasing the soil carrying capacity of the cleaner and therefore extending the useful life of the cleaner—phosphate solution (by converting certain unsaturated and/or aromatic contaminants into emulsifying and cleaning agents) is achieved, while extending and regenerating the phosphate coating solution's original phosphate coating accelerator compound. Both the phosphate coating accelerator and cleaner properties must be regenerated to be able to reuse the phosphate coating solution. Typically, these phosphate coating parts cleaner baths are frequently (sometimes weekly) dumped and replaced with new product.

The apparatus and method of the invention is useful for the capture and control of a variety of cleaning and process solvent emissions such as those containing o, m & p-xylenes, toluene, ethyl benzene, and various ketones, alcohols, acetates, esters, and other aromatic compounds.

Ground water, wastewater and process water are treated in a similar fashion. Reaction of target contaminants and reaction by-products with the oxygenation reagent and reaction of target contaminants and reaction products with secondary oxygenation species formed by reactions of oxygenation reagent with water creates a non-hazardous product available for use, re-use, further treatment or disposal. A preferred embodiment includes the combined stripper/reactor discussed above where the contact with the oxygenation reagent occurs in counter-current flow in a stripper leading to reaction primarily in the gas phase and at the vapor liquid interface. Secondary oxygenation species formed by reaction of the oxygenation agent with water will react primarily in the liquid phase with less volatile and non-volatile compounds in the liquid phase.

Off-gasses, such as those produced by the burning of fossil fuel, emissions from bakeries and restaurants, and emissions from paint ovens, can be treated in another embodiment of the invention or captured in a scrubber first and then treated in the stripper/reactor as previously described. For off-gases that are already hot, one of the preferred embodiments would include a counter-current flow scrubber where the hot exhaust gases are progressively cooled and the scrubber liquid is progressively heated as they both flow through the scrubber in a counter-current flow. Some volatile compounds would be condensed and their volatility reduced due to the temperature profile of the scrubber. The hot gas feed would tend to re-volatize the condensed volatiles leading to an increased concentration of volatile contaminants in the scrubber. By feeding the oxygenation reagent into the scrubber at a point between the gas and liquid feeds where the accumulating volatile contaminant is still volatile, it can be reacted with the oxygenation reagent in the gas phase. This results in a scrubber/reactor combination embodiment as distinguished from the previously described stripper/reactor. Cleaned off-gas is exhausted from the scrubber/reactor to further treatment, if needed, re-used or vented to the atmosphere. Heat recovery is possible from the scrubber liquid. After the scrubber liquid is cooled, the scrubber liquid can be re-used in the scrubber/reactor. Scrubber/reactor and stripper/reactor combinations are also possible and can be combined to increase ultimate process capture efficiency. In such a case, the scrubber liquid and stripper liquid would circulate in a loop with the off-gas contaminated exhaust feed to the scrubber being the source of volatile contaminants being captured and controlled. The result of combining both embodiments is a gas stream meeting regulatory requirements and a liquid stream that has been regenerated.

An alternate embodiment would include the treatment of sticky tacky fluids, flowable sludges and wastes (perhaps with prior dilution to form a pumpable solution) with poor filtration properties. By treating these materials first with the stripper/reactor process, and thereby detackifying the solution, filtration of the resultant detackified solution is enabled. In some cases, a partial polymerization and aggregation of molecules will occur as well as improving the filterability of the solution This is in addition to other possible benefits described above. Filtration of sticky tacky paint contaminated paint booth wash water and similar sticky tacky used contaminated scrubber liquids, and other similar process or waste liquids and sludges is not possible or economical unless they are first some how detackified. Water wash paint booths have in the past been detackified using chemical additives such as clays, organic detackifiers, polymers and flocculates at substantial cost to the customer.

The current invention is useful in recovery of pigments, polymers, metals and other valuable materials in paint. Effective recovery through filtration is made possible through the detackification of paint ingredients. Detackification includes reacting the paint or coating waste product with the oxygenation reagent of the invention such that detackification occurs. For paints containing reactive monomers, detackification includes at least partial polymerization of such monomers. Detackification also includes the aggregation of paint ingredients.

Due to the universal nature of the invention, contaminants of various sources can be combined for treatment. For example, off gases from wet paint water wash paint booths can be combined with the off gasses from the bake oven used to dry the painted parts and/or the paint sludge and/or the vent gases from solvent-based parts washers.

BRIEF DESCRIPTION OF THE DRAWINGS

Among the Figures, like numerals designate like or similar items.

So that the manner in which the above-recited features, advantages and objectives of the invention, as well as others which will become apparent, are attained and can be understood in detail a more particular description of the invention briefly summarized above may be had by reference to the embodiments thereof illustrated in the drawings, which drawings form a part of this specification. It is to be noted, however, that the appended drawings illustrate only preferred embodiments of the invention and are, therefore, not to be considered limiting of the invention's scope, for the invention may admit to other equally effective embodiments.

DETAILED DESCRIPTION OF THE INVENTION

The current invention includes a process and apparatus for reacting the contaminants with an oxygenation source to convert the contaminants primarily to intermediate products with desirable characteristics. By contacting volatile organic contaminants with the limited oxygenation source, such molecules are converted into compounds that preferably are themselves much less volatile or non-volatile. This limited reaction produces a range of products, depending on the contaminants. Ketones, aldehydes, alcohols, polyols and compounds containing carboxylic acid and/or carbonyl functional group(s) can result. By controlling and limiting the oxygenation reaction to create the intermediate products such as the salts of carboxylic acids, di-acids, polyols and amphoteric compounds such as diacid polyols and the like, the contaminants are modified into components that act as volatile compound absorbents that can emulsify additional volatile components, that would not be otherwise captured, into the scrubber solution.

The invention is applicable to many varied applications. Examples of such applications include, but are not limited to, paint spray booth pollution control paint sludge and excess paint disposal, detackification of paint sludge, water wash paint booth scrubber solution, liquefied industrial sludges, cleaning solvent, such as those useful to clean metal parts prior to painting, off-gas vent control, ground water remediation, process water or wastewater treatment, off-gas treatment such as from a process using fossil fuel, off-gas treatment for bakeries and restaurants, and other applications where the volatile compounds occur in vapor or liquid form such that a disposal or recovery need arises.

A method of treating a contaminated fluid 10 having at least one contaminant having a property selected from the group consisting of being volatile, hazardous, tacky and a combination thereof is provided. Referring now to FIG. 1, the method comprises contacting the contaminated fluid 10 with an effective amount of an agent 12 and generating a treated fluid 14. The agent 12 is selected from the group consisting of oxidizing agents, free radical producing agents and a combination thereof. The contaminated fluid 10 is contacted with the agent 12 in at least one vessel 16 for an effective amount of time to convert a substantial amount of the at least one contaminant to at least one corresponding modified contaminant. The contaminated fluid 10 and the agent 12 may be contacted counter-currently or co-currently. The modified contaminant has a property selected from the group consisting of being non-volatile, less volatile than the contaminant, non-hazardous, less hazardous than the contaminant, non-tacky and a combination thereof. The treated fluid 14 has a level of the at least one contaminant and of the at least one corresponding modified contaminant to allow the treated fluid 14 to at least meet requirements for release, reuse or further treatment. The contaminated fluid 10 and the treated fluid 14 may be in a gaseous or liquid form. The vessel 16 may be a reactor.

The agent 12 may be contained in a carrier with which it may be reactive or not. The agent 12 can be a free radical producing agent, for example, selected from the group of free radical initiators, free radical propagators and combinations thereof. The free radical producing agent may be a peroxide, which may be an organic peroxide, an inorganic peroxide or combinations thereof. The peroxide may be added or formed in situ. In the latter case, ozone produces hydrogen peroxide in water.

The agent 12 may be an oxidizing agent. A preferred oxidizing agent is ozone. In some cases, ozone may be referred to as activated oxygen. Other oxidizing agents include potassium permanganate and periodic acid.

Figure 5:
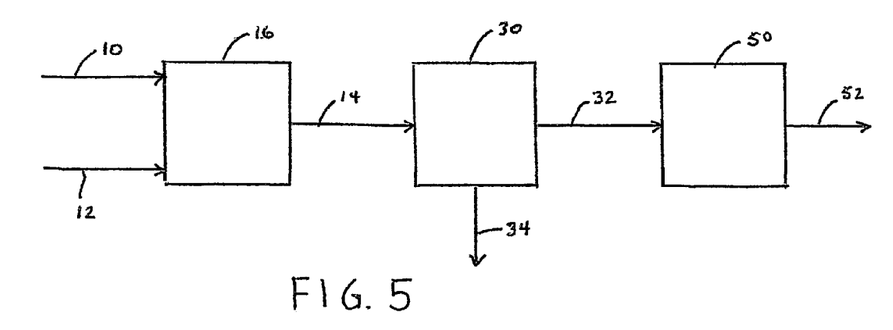
FIG. 5 is a flow schematic of another embodiment of the present invention adding to that shown in FIG. 1 a filter and bioreactor.

Referring now to FIG. 5, the method may further include the step of filtering the treated fluid 14 to generate a filtered fluid 32 and collected materials 34. The filtered fluid 32 may then be fed to a bioreactor 50 for bioconversion to bioproducts 52. The bioreactor 50 may be an anaerobic bioreator, an aerobic bioreactor or a combination thereof. The bioproducts 52 include, but are not limited to, biotreated water, biogas containing methane and fertilizer.

When the at least one contaminant is tacky, the effective amount of the agent 12 is an amount that detackifies such tacky contaminant.

Referring now to FIG. 2, there is shown another embodiment of the present invention, which adds onto that shown in FIG. 1. In this embodiment, the method further comprises contacting of a contaminated off-gas 18 with a contacting liquid 20 generating a treated off-gas 29 and the contaminated fluid 10. The contaminated off-gas 18 contains at least one contaminant. During such contacting, the contacting liquid 20 removes at least a substantial portion of the at least one contaminant from the contaminated off-gas 18. The contaminated off-gas 18 and the contacting liquid 20 can be contacted counter-currently or co-currently. The contacting may occur in a scrubber 22.

Referring now to FIGS. 2 and 3, the method may further comprise cooling a hot contaminated off-gas 28 resulting in the contaminated off-gas 18 prior to contacting with the contacting liquid 20. The cooling is used to at least partially condense a portion of the at least one contaminant to facilitate removal thereof by the contacting liquid 20. This may be done using a heat exchanger 24 with a cooling source 26. Alternatively, or in addition thereto, the contaminated off-gas 18 may be cooled by contacting it with the contacting liquid 20 that is cooler than the contaminated off-gas 18 to at least partially condense a portion of the at least one contaminant to facilitate removal thereof by the contacting liquid 20.

The contaminated off-gas 18 is generated by a variety of processes and establishments. General examples include, but are not limited to, off-gases from industrial processes, pharmaceutical processes, solvent cleaning processes, solvent degreasing processes, fiberglass operations, ink and printing operations, wood and wood products drying processes, food industries, rinsing processes and paper mills. Specific examples include, but are not limited to, off-gases from paint shops, bakeries, restaurants, dry cleaners and burning of fossil fuel. These are too small to be presently regulated due to the high costs associated with conventional technology, but are particularly suited for treatment with the methods of the present invention in a cost-effective manner.

Figure 4:
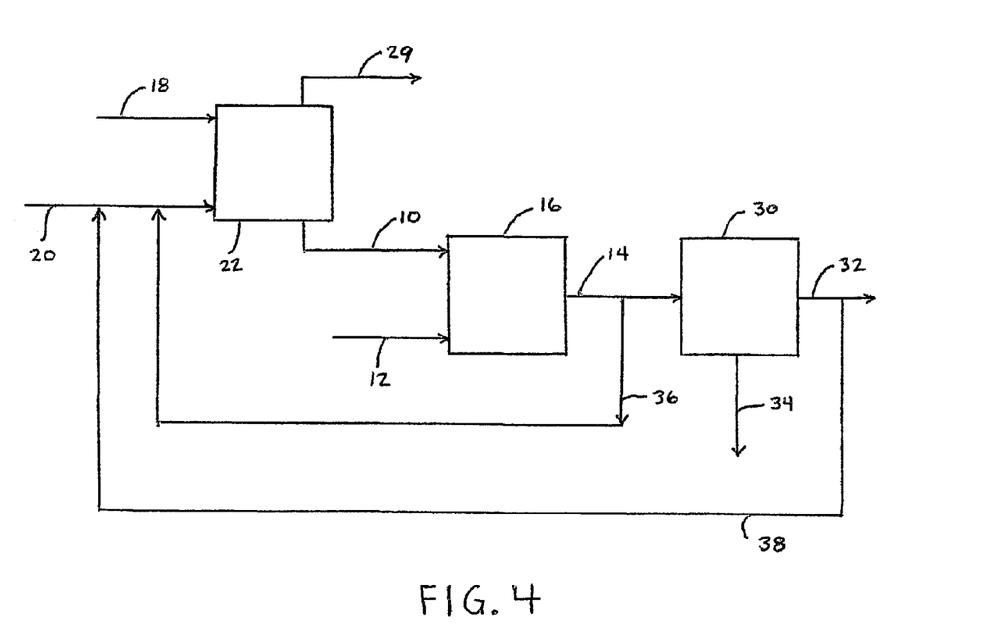
FIG. 4 is a flow schematic of another embodiment of the present invention adding to that shown in FIG. 2 a filtering step and recycle of the treated and/or filtered streams.

Referring now to FIG. 4, the method shown in FIG. 3 is modified in one or more ways. For example, the method may further comprise filtering the treated liquid 14 using a separating device 30 to generate a filtered liquid 32 and collected materials 34. The method may further comprise recycling at least a portion of the treated liquid 14 to the contacting liquid 20, which is referred to as a recycled treated liquid 36. Alternatively, or in addition thereto, the method may include recycling at least a portion of the filtered liquid 32 to the contacting liquid 20, which is referred to as a recycled filtered liquid 38.

Figure 6:
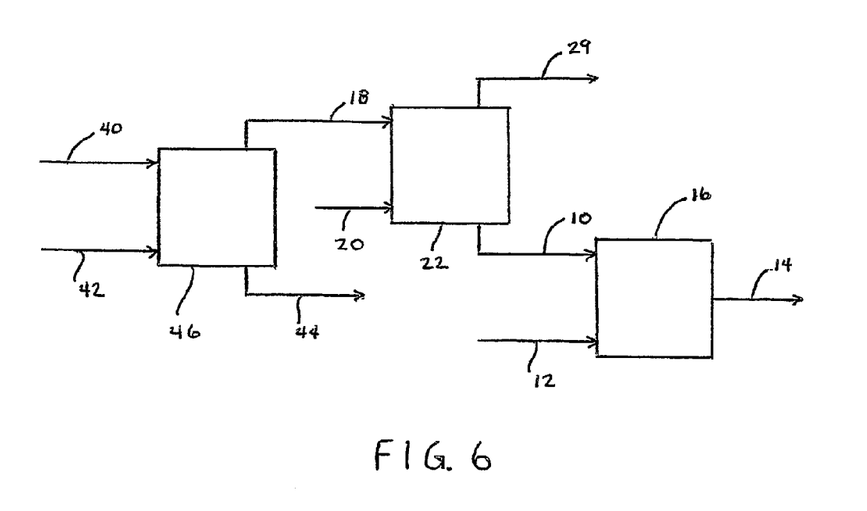
FIG. 6 is a flow schematic of another embodiment of the present invention adding to that shown in FIG. 2 a stripping step.

Referring now to FIG. 6, the method shown in FIG. 2 may be further comprise stripping volatile contaminants from a contaminated liquid stream 40 by contacting the contaminated liquid stream 40 with a stripping stream 42 to generate a treated liquid stream 44 and the contaminated off-gas 18. Such contacting may occur within a vessel called a stripper 46. The stripping stream 42 may be any gaseous stream capable of removing such volatile contaminants, and is preferably selected from the group consisting of air, steam and a mixture thereof. The stirring stream 42 may contain or be the agent 12.

Figure 7:
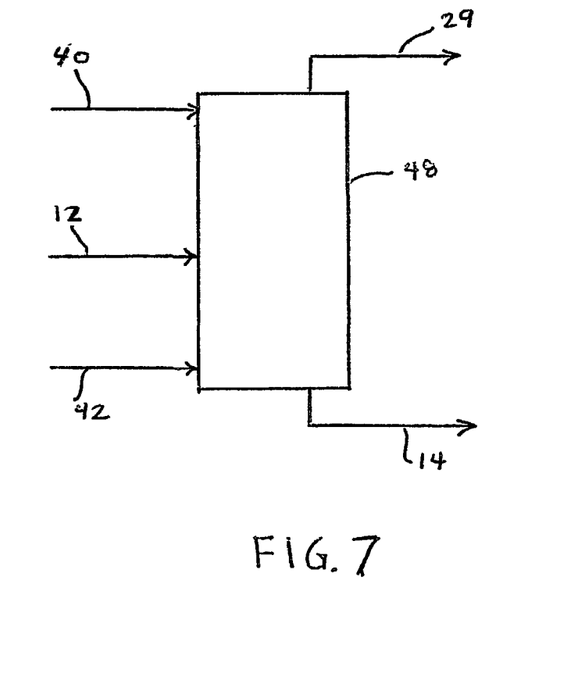
FIG. 7 is a flow schematic of another embodiment of the present invention similar to that shown in FIG. 6, but only utilizing a single vessel as a stripper/reactor.

Referring now to FIGS. 6 and 7, when the treated liquid stream 44 is the contacting liquid 20, the method may be performed in a single vessel called a stripper/reactor 48. The contaminated liquid stream 40 may be fed at or near the top of the vessel 48 and the stripping stream 42 is fed at or near the bottom of the vessel 48. Preferably, the agent 12 is feed at a point between the top and bottom of the vessel 48. The treated off-gas 29 exits at or near the top of the vessel 48. The treated fluid 10 exits at or near the bottom of the vessel 48. The contaminated fluid 10 and the contaminated off-gas 18 are internalized to the vessel 48, and accordingly not shown.

Figure 8:
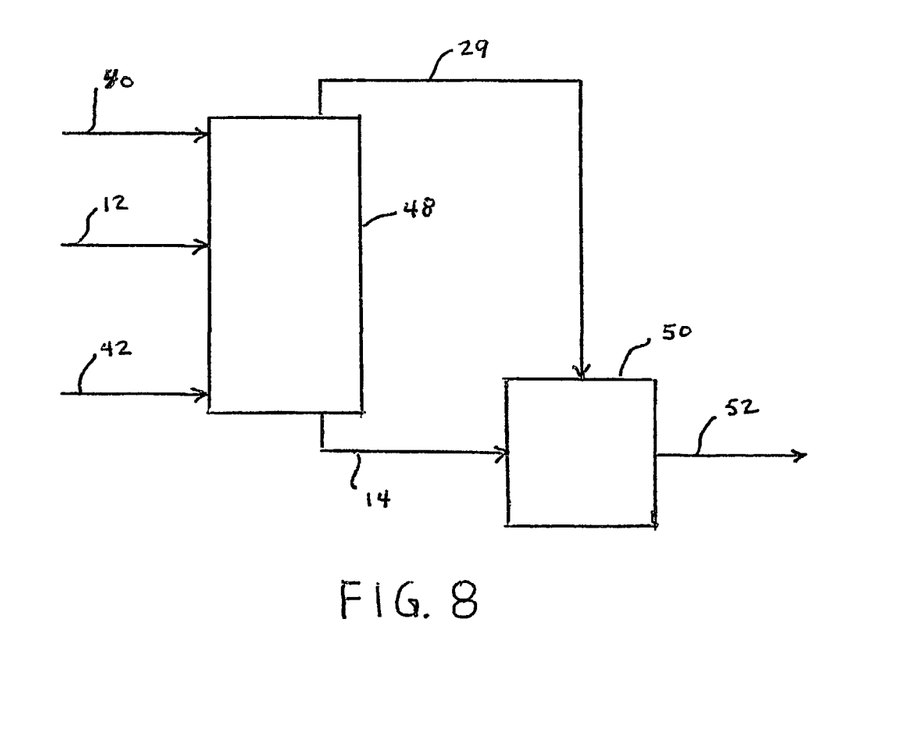
FIG. 8 is a flow schematic of another embodiment of the present invention similar to that shown in FIG. 7 with the addition of a bioreactor.

Referring now to FIG. 8 which is a modification of FIG. 7, the treated fluid 14 can be fed to a bioreactor 50 to generate bioproducts 52. The treated off-gas 29 can also be fed to the bioreactor 50. This is preferable when the treated off-gas 29 has an oxygen concentration greater than ambient air.

Referring again to FIG. 1, the contaminated fluid 10 may be contaminated air or contaminated water. The are many sources of both. The contaminated air may be the contaminated off-gas discussed previously. Contaminated water includes, but is not limited to, water that contains paint, water that contains paint-related solvents, cleaning bath liquid, phosphating bath liquid, ground water, wastewater, process water, rinse water, scrubber water and combinations thereof.

One type of contaminated water of interest herein is water that contains paint and/or paint-related solvents. Sometimes this type of contaminated water also contains a floating contaminant. In this situation, the method may further comprise removing the floating contaminant prior to contact with the agent to generate a skimmed water stream and skimmed contaminant. Water that contains paint poses a special treatment problem of containing contaminants that are tacky and cause problems with filtering or other removal techniques for removing such contaminants. In this case, the agent 12 preferably has the additional property of detackifying the tacky components in paint. The agent 12 is added in an effective amount to also detackify such tacky components. Thereafter, the method may include the step of filtering the treated fluid 14 (which is a liquid) to generate a filtered liquid 32 and a recovered material 34, for example, using a separating device 30, similar to the first portion of FIG. 5 without the bioreactor 50. The recovered material 34 may then be separated to recover desired materials therefrom that include, but are not limited to, pigments, monomers, metals and combinations thereof. At this point, the monomers may also include oligomers or partially polymerized monomers.

A particular source for the water that contains paint is wash water from a paint booth and also paint sludge. Likewise, in the paint industry, a problem exists with disposal of excess paint or used paint and/or paint sludge. In this case, the water that contains paint may be obtained by combining water with paint and/or paint sludge that requires disposal and utilizing the method of the present invention.

Another source of contaminated water which is of particular interest is a phosphating bath liquid. A preferred agent in this case is ozone. The ozone reacts with water to form peroxides that accelerate phosphate coating formation. In one embodiment, the ozone and water are mixed prior to contacting the phosphating bath liquid, which is sometimes referred to as ozonated water. An additional benefit of using ozone or ozonated water is that the ozone may be added in an effective amount to also act as a phosphate-coating accelerator, a secondary phosphate-coating accelerator compound producer, phosphate-coating accelerator compound regenerator or combination thereof therein. The ozone may be added in an effective amount to act as the phosphate-coating accelerator therein, thereby replacing conventional accelerators that pose disposal problems and may be toxic. In such a situation, the ozone will also cause the production of secondary accelerators in situ, for example, hydrogen peroxide.

In view of the varied sources of contaminated fluids 10, the methods of the present invention may be integrated into such processes to provide treatment of such contaminated fluids 10. Accordingly, in a main process that utilizes a contacting gas and generates at least one main off-gas containing a contaminant, the process according to the present invention, for example, as shown in FIG. 2 may be used to treat such main off-gas as a contaminated off-gas 18. When there is a plurality of main off-gas streams, the plurality of main off-gas streams are combined to form the contaminated off-gas 18. Additionally, at least a portion of the treated off-gas may be recycled to the main process as part of or as the contacting gas.

Further, in a main process that utilizes a contacting liquid and generates at least one main liquid containing a contaminant, the process according to the present invention, for example, as shown in FIG. 1, may be used to treat such main liquid as a contaminated fluid 10. When there is a plurality of main liquid streams, the plurality of main liquid streams are combined to form the contaminated fluid 10. Additionally, at least a portion of the treated fluid may be recycled to the main process as part of or as the contacting liquid. In another embodiment, only a minor portion of the at least one main liquid is provided as a slip-stream for treatment. This allows for a more continuous operation of the main process.

Figure 9:
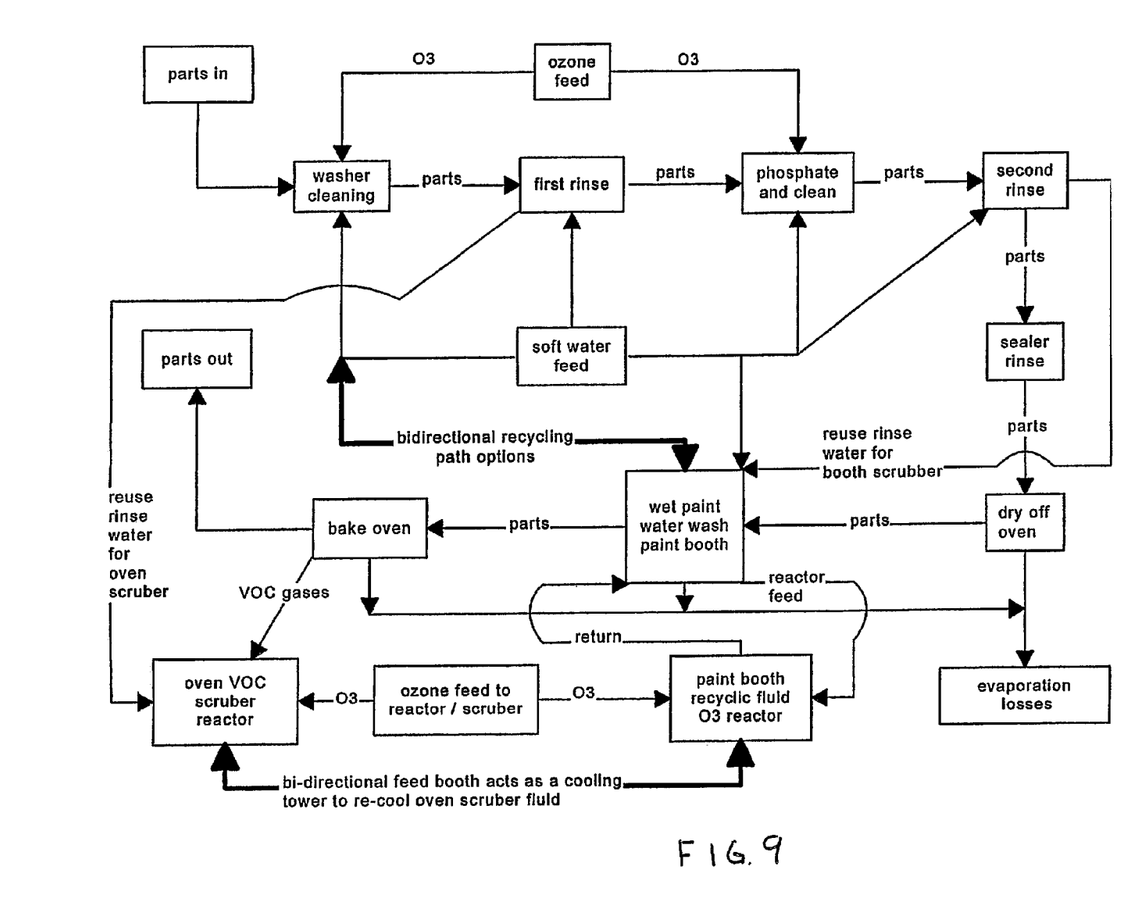
FIG. 9 is a flow schematic of another embodiment of the present invention

An example of a main process situation incorporating the present invention is shown in FIG. 9. One preferred embodiment of the invention integrates many of the fluid and heating processes in a painting operation and thereby reduces water consumption and the generation of wastewater. Water wash paint spray booth scrubbers evaporate large amounts of water. Heated solutions of cleaners, phosphating solutions, rinses and dry off ovens also loose water to evaporation. Any scrubber, scrubber/reactor, or scrubber reactor condenser added to the exhaust of a paint line bake oven, or integrated feeds from a coating operation will also loose water to evaporation as a normal part of the process. Furthermore rinse waters are typically overflowed to keep soluble solids in solution from reaching the supersaturation point so that precipitation and scaling are eliminated or minimized.

In this preferred embodiment overflowed rinse waters are reused as make up water to replace water lost to evaporation in the cleaner bath(s), phosphating bath(s), paint bake oven off-gas scrubber(s), and water wash paint spray booth(s). In this manner water consumption is minimized, surfactants and contaminates that are collected in the rinse water are reused in the cleaner, phosphating, paint bake oven off-gas scrubber, and water wash paint spray booth(s) and waste water disposal and related costs are further minimized.

Furthermore pretreatment of raw water feed using a water softener will reduce rinse water requirements, and surfactant consumption (precipitation of hard water scum).

Excess surfactants from the regenerated cleaning solution bath can be used by bleeding any excess to one of the water wash paint spray booth scrubbers, paint bake oven(s), phosphating bath(s), visa versa, or even mixed (blended) to create a mixed solution where VC absorption and adsorption properties, cleaner emulsification and solubilization properties and detakification of contaminates are maximized, while dynamic surface tension properties are minimized.

Finally, integration of the water wash paint booth's recyclic fluid regeneration reactor with the paint bake oven's recyclic fluid scrubber reactor would include heat recovery. In situations where it is desirable to heat the fluid feed to the water wash paint booth scrubber's recyclic fluid regeneration reactor to improve the flash of VCs in the reactor into the gas phase, recovered heat from the paint bake oven's recyclic fluid scrubber reactor would be used with a heat recovery heat exchanger to-reduce the heat input required for the water wash paint booth scrubber's recyclic fluid regeneration reactor. In cases where the water wash paint booths recyclic scrubber fluid is heated it would be advantageous to cool the fluid before returning it to the water wash paint booth scrubber. In this case cool exhaust air from the discharge of the paint booth exhaust would be used to cool the returning regenerated recyclic scrubber fluid before it is reintroduced back into the water wash paint booth scrubber using an air cooled heat exchanger.

An alternate embodiment would use the bake oven's recovered heat to reduce the input heat requirements for drying washed parts in the dryer stage before paint application in the paint booth, the heated cleaning solution, the heated phosphating bath, or to reduce heating requirements used to increase the VC flashing stage of the water wash paint booth's recyclic fluid regeneration reactor. By detakifying these fluids the use of heat exchangers becomes economically viable since the non-fouling, detakified, non-supersaturated fluids will keep the heat exchanger surfaces clean and energy efficient.

The scrubber 22 of the current invention can be a traditional scrubber, such as a water wash as in a paint spray booth, an electrostatic precipitator, a venturi scrubber or other traditional apparatus. A preferred embodiment includes an air or gas pretreatment step where the temperature and/or pressure are manipulated prior to scrubbing. Depending on the character of the contaminated gas or liquid stream, mechanical filtration can also be performed. For example, skimming can be utilized to remove large amounts of contaminants with the remaining liquid being treated in a stripper reactor. The skimmed material can be further processed in the same manner as paint sludge herein to convert the contaminants therein into compounds that are less hazardous or non-hazardous, and/or as a feed to a bioreactor 50. In this manner, costs can be minimized while concentrations of VCs are minimized or eliminated.

Another preferred embodiment includes further treatment after the scrubbing process, such treatment removing additional or different contaminants. Thus, post treatment can include an adsorber, biofilter or other additional contaminant-capturing device. The air or gas stream, jointly referred to as air stream, can also be subjected to electron beam, ultrasonics, magnetic field or electromagnetic radiations. The scrubbed air stream (treated off-gas 29), whether or not post treated, is then vented to the atmosphere or recirculated or used as an oxygen source for an aerobic bioreactor, as desired. Oxygen concentration in the liquid sparged phase of aerobic bioreactors follows Henry's Law, thereby limiting treatment rates. However, if the oxygen concentration in the oxygen-containing stream fed to the bioreactor is higher than ambient, then the maximum oxygen concentration in the bioreactor liquid is raised proportionally, reducing the required bioreactor volume. Therefore, in cases where the scrubbed air stream has an oxygen concentration higher than ambient, such a stream would have the additional benefit of allowing the use of a smaller reaction volume for the bioreactor. Thus, additional acquisition capital savings could be realized on the bioreactor.

The bioreactor 50 can be an anaerobic reactor used to produce methane biogas that can be used to fire bake ovens on a paint line, or bakery ovens or the like. The bioreactor can also be aerobic, a combination of aerobic and anaerobic stages tied together in series or parallel. Fluidized bed bioreactors, biologically activated carbon filters, biologically activated carbon fluidized bed reactors, biotrickling filters, packed bio-active columns, biologically active sand filters, biologically active fluidized bed media filters (sand and the like), activated sludge bioreactors, rotating biological contactor disks and the like can be used individually or in various combinations depending on the application.

The scrubber liquid (contacting liquid 20) of the invention can be water, organic liquid or inorganic liquid. The scrubber liquid can be inert to reaction with the contaminants, and/or oxygenation agent (agent 12). The liquid can be blended specifically for the target contaminants and can include other additives such as enzymes, surfactants, oxygenation reagents, oxygenation reactive additives and catalysts. When the contaminants are in the air stream, the liquid scrubber fluid is contacted with the air stream carrying the contaminants (contaminated off-gas 18) such that the contaminants are transferred into the liquid fluid. The liquid scrubber fluid with contaminants (contaminated fluid 10) enters the reactor 16 where the contaminants undergo conversion through oxygenation. In a preferred embodiment, oxygenation is performed using agents 12 such as ozone, peroxide, oxygen, catalysts, activated oxygen, electrolysis, enzymes or any combination thereof Oxygenation results in creation of less-volatile components. These components can be further treated if desirable, or discharged, or used to capture more volatile contaminants. As oxygenation creates products that act as surface active agents, emulsifiers or solvents, the liquid scrubber fluid can be enhanced in volatile contaminant absorbing capacity by such process. In such case, the liquid scrubber fluid is returned to the process carrying the products of the conversion of the contaminants, such a recycle streams, 36 nad 38 in FIG. 4.

One preferred embodiment of the scrubber of the invention is a dual stripper/reactor that is a vertical tower 48 (FIG. 7). The contaminated liquid 20, such as wastewater, ground water or contaminated scrubber fluid, enters the tower 48 from the top, for example, as a gravity feed or pressurized feed. Where the reagent is volatile, such as ozone, reagent gas is fed counter-current to the liquid stream. A counter-current stripper/reagent gas stream is fed at the bottom of the tower. A vapor liquid exchange occurs within the tower leading volatile contaminants to come into contact with the ozone or oxygenation reagent contained in the reagent gas stream and react to form less hazardous or non-hazardous, usable, biodegradable, or less volatile or non-volatile materials. Wastewater treated in such manner is then suitable for disposal, heat recovery, filtration, further treatment or for re-use. Liquid scrubber fluid treated in such manner is ready for re-use, heat recovery, filtration or disposal.

Another alternate embodiment includes separate stripping and reaction stages or vessels where the reaction stage permits reaction with contaminants in the gas phase. The stripping stage is used to remove or flash the volatile contaminants from the liquid wastewater or scrubber fluid (liquid) stream. The volatile contaminants removed by the air stream or steam stripping are then fed to the reactor stage. Reagents such as ozone, ozone/water reaction decay oxygenation products such as super oxide radical anion, $HO_2$ (hydroperoxide radical), ozonide radical ion, hydrogen peroxide, organic peroxides formed by reaction with contaminants, organic peroxides, UV radiation, other oxygenation reagents, or radicals such as hydroxyl free radicals or organic radicals are then used to treat the air stream. Typically, the reaction products condense, dissolve, and/or are absorbed or adsorbed by the scrubber liquid.

One of the reactions believed to occur is direct oxidation of the contaminant such that carbon-carbon double or triple bonds (i.e., Pi bonds) are attacked by the oxygenation reagent. Unlike other reactions where the carbon skeleton of the starting material is left intact, ozone can open alternating double bonded aromatic ring structured compounds forming unstable ozonides. These ozonides further decay after combining with water to typically form two new compounds. One compound has a carbonyl functionality such as an aldehyde or ketone. The second compound is a Zwitterion (II) that quickly leads to a hydroxy-hydroperoxide (III) stage that in turn decomposes into a carbonyl compound and hydrogen peroxide. Hydrogen peroxide formed from ozonide decay and from ozone reaction with water can react as an oxidizing agent, reducing agent and or free radical reaction reagent and promoter. The oxygenated end of the molecules created creates a molecule with a polar (water loving) end. The other end remains a non-polar end. Those molecules having one polar end and one non-polar end (oil loving) act as surfactants. The non-polar oleophilic end will be hydrophobic and be attracted to other organic molecules, while the carbonyl end will be hydrophilic and attracted to water and other polar compounds, allowing the molecule to act as a surfactant. Other strong oxidizing agents useful in the invention include potassium permanganate and periodic acid. Other contaminants, such as diols, undergo similar reactions. As there are large numbers of possible compounds that are VCs, there are equally numerous non-volatile compounds that can result from this reaction.

There are multiple sources of contaminants associated with paint booth use. Paint ovens also give off VCs in the oven exhaust These off-gases can be routed to a separate scrubber or combined with other scrubber operations available for the paint line. Likewise, wash water in painting operations can include VCs. The VCs can be volatized and combined with the other scrubber operations, fed to a stripper reactor, or contacted in a liquid/liquid separation system.

One embodiment of the invention uses an oil-in-water emulsion system to handle the contaminants. Prior art shows that paint particulate contaminants are brought into contact with such an emulsion, in a liquid gas scrubber called a water wash paint spray booth, primarily to capture paint particulate. The VOCs attach (absorbed) to the oil in the emulsion until equilibrium saturation occurs at which point the emulsion releases VOCs as fast as it captures them. VOC capture is not the design objective in existing systems of this type. The emulsion is then pH shifted by traditional means to break the emulsion. Steam stripping is used to separate the incidental VOCs from the oil phase such that the oil is returned to the emulsion. VOCs released are then treated in secondary operations such as condensation, activated carbon adsorption or incineration. These steps have been or are currently being used in some paint booths.

The current invention includes the step of subjecting the concentrated VOCs to reaction with ozone, secondary ozone reaction products, or other oxygenating reagent in such quantity that a large portion of the volatile contaminants are converted in part to useful products, as discussed above. These useful products are returned to the emulsion system to improve the absorption and adsorption capacity of such system and to maintain the life of the scrubber solution. This reaction lowers the VCs activity and volatility by increasing or adding hydrogen bonding (water loving) ability to the VC contaminant by combining the contaminant with molecular oxygen, thereby increasing the reacted VCs solubility in the hydrophilic (water loving) portion of the scrubber liquid. After contacting the fluid to the contaminant, the fluid being any liquid carrier such as an emulsion, a hydrotropic, blended or other fluid, the contaminated fluid enters the reactor. The used scrubber liquid is reacted as described above to create a cleaning and absorbing and adsorbing scrubber solution with substantially reduced contaminant content and with conversion of those contaminants to useful or non-hazardous components. The reacted scrubber fluid is then available to be placed back into the scrubbing chamber for re-use. Use or operation of the reactor may also be combined with additional traditional steps, such as pH adjustment, manipulation of temperature or pressure, filtration, flocculation, precipitation, skimming, electrolysis, electromagnetic exposure and other steps. Alternatively, the material can be discarded as non-hazardous waste. Such waste product can be used as a feed source for a bioreactor in creation of a biomass fertilizer or a biogas, such as methane. A preferred embodiment includes gathering the liquid stream in a sump, i.e., an equalization tank, such that the feed can be measured and controlled to the reactor to avoid accidental overload.

A preferred embodiment includes temperature, pressure, liquid dynamic surface tension, flow rate, oxygenation reagent concentration, liquid turbidity, contaminant concentration, COD, BOD, TOC, reaction residence time and the like, measurement and control for optimization of the operation. The reactor can be in continuous, batch or continuous batch mode, one or multiple stages.

The invention permits of multiple embodiments with varying degrees of control over the progress of the oxygenation reaction. As described above, a slip-stream can be sent to the reactor such that the reactor acts in a continuous batch mode. In this manner, small amounts of the oxygenation reagent can be added over a long-period of time, which has an added benefit of reducing equipment sizes and associated capital acquisition costs. In situations where the amounts of contaminants vary based on usage, the amount of the oxygenation reagent and the length of residence time leading to oxygenation can be controlled and varied to limit the consumption of oxygenation reagent and to limit the destructive losses of useful organic agents already added or produced by the process.

In situations where it is highly desirable to monitor the amount of contaminants being converted or the build-up of surface active agents in the solution, the amount of contaminants captured is measured. Traditional methods of monitoring can be used. Since the composition of paints is complex, actual compositional analysis is rarely cost effective. This invention includes an optional method of monitoring the contaminants captured in liquid to assure that the liquid is exposed to an appropriate amount of oxygenation reagent. A method of monitoring contaminants can include performing a mass balance on the scrubber fluid, for example, the paint spray booth wash water, to determine the Chemical Oxygen Demand (COD) or Total Organic Carbon (TOC) of the material captured or contained therein as compared to the COD or TOC prior to capture. Other useful information for process control include dynamic surface tension, temperature, pressure, turbidity, pH, contaminant(s) concentration, and surfactant(s) concentration, whether added or produced in situ. By applying and comparing historical and/or test data specific to the process including the COD or TOC information, the amount of oxygenation reagent can be empirically controlled using such information to produce the desired reaction of contaminants. Furthermore, credit can be taken after documenting the capture of said VCs in annual emissions inventories based on such mass balance information.

Paint ovens, bakeries, restaurants and other industries emit VCs from the baking or heating operations. These are released in the form of exhaust gas. These off-gases are routed through the scrubber reactor in gaseous form as described above. The off-gases can be collected into one central location where necessary. An alternate embodiment includes contacting the contaminated off-gas with scrubbing fluid such that contaminants are transferred to the scrubbing fluid. The contaminated scrubbing fluid can then be introduced to the stripper reactor for reaction with the oxygenation reagent. In this manner, it is also effective to combine the contaminated liquids of the system The off-gas captured contaminants, from the oven scrubber or scrubber reactor, can be combined with the contaminants from the water wash paint booth scrubber and wash lines that would then be treated in the reactor to regenerate the wash scrubber liquid.

Another embodiment relates to metal washing liquids. When steel parts are to be painted, oil, grease and metal shavings must first be removed and the surface made receptive to the adhesion of paint. This process is typically performed using a spray wash of a soapy alkaline solution followed by a rinsing step. The resulting effluent may contain some of the volatile contaminants along with various oils and greases. This effluent can be treated as described above either by routing to the scrubber/reactor, stripper/reactor or by using the existing cleaning solution holding tank in which processing takes place as the reactor vessel.

Additional steps are performed to further clean organics off of the metal part to be washed and to finish the surface in such a fashion that paint will adhere. For example, within the coating arena is a specialization involving phosphate conversion coating prepaint treatment baths. These baths depend upon oxidizing agents in the bath to accelerate or catalyze the formation of a metalic phosphate film on the target object. Standard art includes the use of sodium nitrate, sodium nitrite, hydrofluoric acid, nitrobenzene sulfonate, sodium chlorate or the like to catalyze the reaction. Such baths are typically operated at pHs between 3.0 and 6.0. All of these components create waste disposal problems of various magnitudes with nitrobenzene sulfonate being toxic. The present invention includes the use of ozone in he bath in place of or in addition to prior art catalysts or oxidizers.

Another problem is that the phosphate bath begins to accumulate contaminants from the metal parts and from carry over of the previous washing and rinsing steps. These contaminants eventually interfere with the solution requiring regeneration or disposal of solution. With ozone, the benefits described above are achieved in that organic contaminants are washed off the parts and are reacted to create useful and non-hazardous components. For example, they are converted into compounds that increase the soil and contaminant holding, emulsifying and suspending capacity of the phosphate cleaning bath. By oxygenating some of the contaminants and organic compounds, surfactants are produced which increase the soil holding, emulsifying and dirt suspending capacity of the bath and thus increases bath life of the solution.

Another surprising effect of adding ozone to the phosphate bath is that the ozone acts as an oxidizer accelerator, thereby eliminating the need for nitrobenzene sulfonate or the like. Thus, the present invention includes the use of ozone in the bath in place of prior catalysts or oxidizers, or to regenerate reduced oxidizer accelerators thereby extending the useful life of the bath. The added benefit seen when applying the current invention to the phosphate solution includes the use of ozone as the oxidizer accelerator, thus avoiding the addition of less desirable compounds.

Another benefit of using ozone in the phosphate solution is the production of secondary inorganic and/or organic oxidizers, free radical initiators, propagators, accelerators and/or catalysts resulting from the reaction of ozone with water and/or other compounds in the water. This avoids the addition of less desirable compounds and/or extending the useful life of the phosphate cleaning bath.

Typically, the metal part is immersed into a tank containing or sprayed with the phosphate bath such that the surface of the part becomes coated with an iron, zinc or the like phosphate film by reaction of the bath with the metal surface of the part. While the phosphate bath liquid can be introduced into the reactor described above and then recycled to the bath, an alternate embodiment is to add ozone directly to the phosphate bath and/or to the phosphate bath washer while the parts washing spray system is in operation. Using the spray washer as a means of contacting the phosphate bath with the ozone, eliminates additional contacting equipment and provides the associated cost savings. In a spray phosphate washer, the ozone can be introduced in the gas phase to the spray parts washer spray phosphating section such that sprayed liquid interacts with gaseous ozone as it contacts the metal parts being washed and phosphated. In this fashion, contaminants and soil in the solution are converted and the oxygenation phosphate coating acceleration reaction goes forward. Some ozone will react with water forming peroxides in the liquid phase. Peroxides can also accelerate the phosphate coating formation. Alternatively, "ozonated water" can be prepared by mixing ozone with water creating hydrogen peroxide in situ. The ozonated water can then be fed to the phosphate bath or to the phosphate bath washer.

The reactor of the invention permits oxygenation of the contaminants through chemical reaction with ozone, peroxide, catalyst, electrolysis, enzymes or any combination thereof. When using a gaseous oxygenation reagent such as ozone, the gas is typically fed in counter-current to the liquid stream containing the contaminants. One particular method of creating ozone content is to treat the input air stream containing oxygen to the reactor by corona discharge reaction, exposure to UV, electrolytic ozone generators or other known methods of creating ozone. The amount of ozone used is less than that required for sterilization or total destruction of contaminants. It is undesirable for economic and ecological reasons to use excess ozone. In a preferred embodiment, ozone is totally consumed (i.e., reacted) in the reactor(s) and/or bioreactor prior to exhaust gas venting to the atmosphere or recycling of the vent gas.

Paint booth water builds up with paint particles that are sticky and must be chemically detackified. Ozone and other-oxygenation reagents, in chemically changing that part that makes the paint sticky and tacky, detackify the water wash paint booth water. Thus, oxygenation serves to detackify the paint providing a benefit additional to that of the modification of the volatile contaminants targeted. Apart from conversion to non-volatile and less volatile compounds to meet regulatory and re-use requirements, the present invention is useful for detackifying paint. This in turn permits recovery of useful by-products, use of various separation techniques and other processes that would otherwise be inappropriate due to the tacky consistency of paint. This chemical change improves the filterability of the liquid and also alleviates the adhesion of residue on water wash paint booth holding vessels and the like. Typically, water wash paint booth holding vessels and the like must be replaced every three years due to the nature of the buildup and associated corrosion that results.

It is believed that in part damage to the vessels is due to anaerobic bacteria attacking the vessel. By eliminating residue and sticky tacky properties, the adhesion of bacteria slime colonies that typically accelerate anaerobic bio-film corrosion is eliminated, or at least minimized. By adding only limited amounts of ozone, some of the bacteria but not all (in the stripper reactor) may be killed. In a preferred embodiment, the feed to the stripper reactor is heated to temperatures high enough to pasteurize the scrubber reactor liquid while simultaneously flashing the VCs into the gas phase which has its own benefits described above. As the detackification process creates surfactants that in turn makes an environment where the bacteria cannot readily adhere to the wash section surfaces to form colonies, substantial killing (or sterilization) of the bacteria becomes unnecessary, just limiting the growth is sufficient to extend the life of the vessel. This also creates an oxygenated environment that further limits the future growth of anaerobic bacteria.

Thus, bio-corrosion caused by anaerobic bacteria is avoided, or at least minimized, without the use of additional toxic biocides.

Likewise, filtration is positively affected as a result of detackification. Without detackification, the waste solids would be virtually glued to any filter used to separate liquid from solid, creating inefficiencies and leaving a liquefied, hazardous waste sludge. By conversion in the current process, these hazardous wastes are converted to non-hazardous wastes or even by-products that can then be shipped to recyclers without the cost and difficulty incurred in shipping hazardous waste and locating recyclers qualified to handle hazardous waste. The present invention is also useful to those recyclers who receive hazardous waste as they can convert such waste to non-hazardous waste by using the method of the current invention.

One problem identified with oxygenation of long chain hydrocarbon contaminants and continuous recycling includes the accumulation of soaps. While the presence of soap is desirable for increasing the capacity of the cleaning or scrubbing solution, metal ions tend to convert carboxylates, the intermediate products, into metal salts (i.e., metal carboxylates) that may be insoluble and could eventually produce scale if not periodically removed. Scale, in turn, lowers the efficiency of heat transfer equipment and creates other process problems. Scale typically consists of carbonate scale. Insoluble carbonates are left behind, particularly as water is boiled off, leaving deposits. The deposit is a poor conductor of heat and the efficiency of a heat exchanger is thereby decreased. Therefore, in a preferred embodiment of this invention, recycled liquids are slowly bled to secondary treatment such as a bioreactor or discharged to a POTW or local waste water treatment system, such that the final products are water and biosludge that can possibly be re-used as fertilizer or the like. Application of the present invention reduces the formation of scale as non-ionic surfactants, chelating agent surfactants and sequestering agent surfactants are created through the partial reaction of the contaminants. These substances do not form a precipitate when combined with calcium, iron or the like. In this fashion, scaling is avoided, or at least minimized, in the stripper reactor, scrubber reactor and heat exchanger.

While the present invention addresses the problem of chemically converting contaminants from excess paint involved in painting operations, the present invention can also be applied to left over unused waste paint. Disposal of excess paint, even in its original container, is a hazardous waste problem Similarly, paint sludge is an industry problem. Just as the ozone applied in the reactor of the present invention converts the paint present in solution, the stripper oxygenation reactor can be used to convert and treat paint sludge and excess paint. Disposal of paint is a particularly large problem for paint shops and maintenance sheds. Preferably, the paint is diluted before introduction to the reactor. Again, the process can be continuous, batch or continuous batch with recovery of valuable products possible or with the disposal of the intermediate products to different applications such as a bioreactor that produces fertilizer. In this manner, a hazardous waste becomes a useful product.

The difference in amounts of oxygenation reagent required as opposed to total oxidation can be 10 to 1000 orders of magnitude in difference. Also, by concentrating the contaminants into a smaller volume and/or by treating a slip-stream in a continuous batch mode, the size of the reaction vessel, whether scrubber or reactor, is minimized. Ozone generators come in a variety of types and can be prohibitively expensive. By reducing the ozone requirement by 10 to 1000 orders of magnitude as compared to total destruction, it is now possible to regenerate solution from a paint shop, for example, with a simple V-generator at a fraction of the cost necessary for total destruction. Vessel costs will also be reduced dramatically. As shown above, reduction of scale and deposit on vessels results in decrease of operating costs, as does detackification of paint. Thus, the result of application of the present invention is a surprising reduction of cost associated with effective treatment of the contaminants.

A preferred embodiment of reacting contaminants with the oxygenation reagent includes controlling pH in the reaction zone between 9 and 11 using sodium or potassium hydroxide, sodium or potassium carbonate, or the like as the preferred alkali. By maintaining the solution at this pH throughout the process, the anaerobic biocide effect (and therefore corrosion control) is further enhanced without addition of highly toxic biocides.

While several embodiments have been described and illustrated, it will be understood that the invention is not limited thereto since many modifications may be made and equivalent structures will become apparent to those skilled in the art to which the invention pertains.

I claim:

1. A method of treating a contaminated fluid having at least one contaminant which is tacky, the method comprising:
    contacting the contaminated fluid with an effective amount of an agent selected from oxidizing agents, free radical producing agents and a combination thereof for an effective amount of time to convert a substantial amount of the at least one contaminant to at least one corresponding modified contaminant which is non-tacky; and
    generating a treated fluid having a level of the at least one contaminant and of the at least one corresponding modified contaminant to allow the treated fluid to at least meet requirements for release, reuse or further treatment.

2. A method of treating a contaminated fluid having at least one contaminant having a property selected from the group consisting of being volatile, hazardous, tacky and a combination thereof, the method comprising:
    contacting a contaminated off-gas containing the at least one contaminant with a contacting liquid to remove at least a substantial portion of the at least one contaminant from the contaminated off-gas generating a treated off-gas and the contaminated fluid;
    contacting the contaminated fluid with an effective amount of an agent selected from oxidizing agents, free radical producing agents and a combination thereof for an effective amount of time to convert a substantial amount of the at least one contaminant to at least one corresponding modified contaminant having a property selected from the group consisting of being non-volatile, less volatile than the contaminant, non-hazardous, less hazardous than the contaminant, non-tacky and a combination thereof;
    generating a treated fluid having a level of the at least one contaminant and of the at least one corresponding modified contaminant to allow the treated fluid to at least meet requirements for release, reuse or further treatment; and
    cooling the contaminated off-gas prior to contacting with the contacting liquid to at least partially condense a portion of the at least one contaminant to facilitate removal thereof by the contacting liquid.

3. A method of treating a contaminated fluid having at least one contaminant having a property selected from the group consisting of being volatile, hazardous, tacky and a combination thereof, the method comprising;
  contacting a contaminated off-gas containing the at least one contaminant with a contacting liquid to remove at least a substantial portion of the at least one contaminant from the contaminated off-gas generating a treated off-gas and the contaminated fluid;
  contacting the contaminated fluid with an effective amount of an agent selected from oxidizing agents, free radical producing agents and a combination thereof for an effective amount of time to convert a substantial amount of the at least one contaminant to a least one corresponding modified contaminant having a property selected from the group consisting of being non-volatile, less volatile than the contaminant, non-hazardous, less hazardous than the contaminant, non-tacky and a combination thereof;
  generating a treated fluid having a level of the at least one contaminant and of the at least one corresponding modified contaminant to allow the treated fluid to at least meet requirements for release, reuse or further treatment; and
  cooling the contaminated off-gas by contacting with the contacting liquid that is cooler than the contaminated off-gas to at least partially condense a portion of the at least one contaminant to facilitate removal thereof by the contacting liquid.

4. A method of treating a contaminated off-gas having at least one contaminant having a property selected from the group consisting of being volatile, hazardous, tacky and a combination thereof, the method comprising:
  contacting the contaminated off-gas with a contacting liquid and an agent having ozone;
  partially oxidizing a portion of the at least one contaminant with the ozone to at least one corresponding modified contaminant having increased water solubility, thereby increasing the contaminant carrying capacity of the contacting liquid; and
  generating a treated fluid baying a level of the at least one contaminant and of the at least one corresponding modified contaminant to allow the treated fluid to at least meet requirements for release, reuse or further treatment,
  wherein the at least one corresponding modified contaminant has a property selected from the group consisting of being non-volatile, less volatile than the contaminant, non-hazardous, less hazardous than the contaminant, non-tacky and a combination thereof.

5. The method of claim 4, wherein the contaminated off-gas is selected from the group consisting of off-gases from paint shops, bakeries, restaurants, dry cleaners and burning of fossil fuel.

6. The method of claim 4, wherein the contaminated off-gas is selected from the group consisting of off-gases from industrial processes, pharmaceutical processes, solvent cleaning processes, solvent degreasing processes, fiberglass operations, ink and printing operation, wood and wood products drying processes, food industries, rinsing processes and paper mills.

7. The method of claim 4, further comprising: recycling at least a portion of the treated liquid to the contacting liquid.

8. The method of claim 4, wherein the contaminated off-gas and the contacting liquid are contacted counter-currently or co-currently.

9. The method of claim 4, further comprising: feeding at least a portion of the treated fluid to a bioreactor for bioconversion.

10. A method of treating a contaminated fluid having at least one contaminant having a property selected from the group consisting of being volatile, hazardous, tacky and a combination thereof, the method comprising:
  contacting a contaminated off-gas containing the at least one contaminant with a contacting liquid to remove at lean a substantial portion of the at least one contaminant from the contaminated off-gas generating a treated off-gas and the contaminated fluid;
  contacting the contaminated fluid with an effective amount of an agent selected from oxidizing agents, free radical producing agents and a combination thereof for an effective amount of time to convert a substantial amount of the at least one contaminant to at least one corresponding modified contaminant having a property selected from the group consisting of being non-volatile, less volatile than the contaminant, non-hazardous, less hazardous than the contaminant, non-tacky and a combination thereof;
  generating a treated fluid having a level of the at least one contaminant and of the at least one corresponding modified contaminant to allow the treated fluid to at least meet requirements for release, reuse or further treatment, wherein the treated fluid is a treated liquid; and
  filtering the treated liquid to generate a filtered liquid and collected materials.

11. The method of claim 10, further comprising: recycling at least a portion of the filtered liquid to the contacting fluid.

12. A method of treating a contaminated fluid having at least one contaminant having a property selected from the group consisting of being volatile, hazardous, tacky and a combination thereof, the method comprising:
  stripping volatile contaminants from a contaminated liquid stream by contacting the contaminated liquid stream with a stripping stream to generate a treated liquid stream and a contaminated off-gas;
  contacting the contaminated off-gas containing the at least one contaminant with a contacting liquid to remove at least a substantial portion of the at least one contaminant from the contaminated off-gas generating a treated off-gas and the contaminated fluid;
  contacting the contaminated fluid with an effective amount of an agent selected from oxidizing agents, free radical producing agents and a combination thereof for an effective amount of time to convert a substantial amount of the at least one contaminant to at least one corresponding modified contaminant having a property selected from the group consisting of being non-volatile, less volatile than the contaminant non-hazardous, less hazardous than the contaminant, non-tacky and a combination thereof; and
  generating a treated fluid having a level of the at least one contaminant and of the at least one corresponding modified contaminant to allow the treated fluid to at least meet requirements for release, reuse or further treatment.

13. The method of claim 12, wherein the treated liquid stream is the contacting liquid.

14. The method of claim 13, wherein the method is performed in a single vessel with the contaminated fluid and contaminated off-gas being internal to the vessel.

15. The method of claim 14, wherein the contaminated liquid stream is fed at or near the top of the vessel and the shipping stream is fed at or near the bottom of the vessel.

16. The method of claim 15, wherein the agent is fed at a point between the top and bottom of the vessel.

17. The method of claim 13, wherein the stripper stream is or contains the agent.

18. The method of claim 13, wherein the treated liquid is fed to a bioreactor.

19. The method of claim 18, wherein the treated off-gas is fed to the bioreactor.

20. The method of claim 19, wherein the treated off-gas has an oxygen concentration greater than ambient air.

21. The method of claim 12, wherein the stripping stream is selected from the group consisting of air, steam and a mixture thereof.

22. A method of treating a contaminated fluid having at least one contaminant having a property selected from the group consisting of being volatile, hazardous, tacky and a combination thereof, the method comprising:
contacting the contaminated fluid with an effective amount of an agent selected from oxidizing agents, free radical producing agents and a combination thereof for an effective amount of time to convert a substantial amount of the at least one contaminant to at least one corresponding modified contaminant having a property selected from the group consisting of being non-volatile, less volatile than the contaminant, non-hazardous, less hazardous than the contaminant, non-tacky and a combination thereof;
generating a treated fluid having a level of the at least one contaminant and of the at least one corresponding modified contaminant to allow the treated fluid to at least meet requirements for release, reuse or further treatment;
filtering the treated fluid to generate a filtered fluid and collected materials; and
feeding the filtered fluid to a bioreactor for bioconversion.

23. A method of treating a contaminated fluid having at least one contaminant having a property selected from the group consisting of being volatile, hazardous, tacky and a combination thereof, the method comprising:
contacting the contaminated fluid with an effective amount of an agent selected from oxidizing agents, free radical producing agents and a combination thereof for an effective amount of time to convert a substantial amount of the at least one contaminant to at least one corresponding modified contaminant having a property selected from the group consisting of being non-volatile, less volatile than the contaminants non-hazardous, less hazardous than the contaminant, non-tacky and a combination thereof; and
generating a treated fluid having a level of the at least one contaminant and of the at least one corresponding modified contaminant to allow the treated fluid to at least meet requirements for release, reuse or further treatment,
wherein the contaminated fluid is water that contains paint which also contains a floating contaminant and the method further comprising removing the floating contaminant prior to contact with the agent to generate a skimmed water stream and skimmed contaminant.

24. A method of treating a contaminated fluid having at least one contaminant having a property selected from the group consisting of being volatile, hazardous, tacky and a combination thereof, the method comprising:
contacting the contaminated fluid with an effective amount of an agent selected from oxidizing agents, free radical producing agents and a combination thereof for an effective amount of time to convert a substantial amount of the at least one contaminant to at least one corresponding modified contaminant having a property selected from the group consisting of being non-volatile, less volatile than the contaminant, non-hazardous, less hazardous than the contaminant, non-tacky and a combination thereof; and
generating a treated fluid having a level of the at least one contaminant and of the at least one corresponding modified contaminant to allow the treated fluid to at least meet requirements for release, reuse or further treatment,
wherein the contaminated fluid is water that contains paint and
wherein the agent has the additional property of detackifying tacky components in paint and the agent is added in an effective amount to also detackify such tacky components.

25. The method of claim 24, further comprising: filtering the treated fluid to generate a filtered fluid and a recovered material.

26. The method of claim 25, wherein the recovered material is separated to recover desired materials selected from the group consisting of pigments, monomers, metals and combinations thereof.

27. The method of claim 24, wherein the water that contains paint is wash water from a paint booth.

28. The method of claim 24, wherein the water that contains paint is obtained by combining water with paint that requires disposal.

29. The method of claim 24, wherein the water that contains paint is paint sludge.

30. In a main process that utilizes a contacting gas and generates at least one main off-gas containing at least one contaminant, a treating process comprising:
contacting a contaminated off-gas containing the at least one contaminant with a contacting liquid to remove at least a substantial portion of the at least one contaminant from the contaminated off-gas generating a treated off-gas and a contaminated fluid;
contacting the contaminated fluid with an effective amount of an agent selected from oxidizing agents, free radical producing agents and a combination thereof for an effective amount of time to convert a substantial amount of the at least one contaminant to at least one corresponding modified contaminant having a property selected from the group consisting of being non-volatile, less volatile than the contaminant, non-hazardous, less hazardous than the contaminant, non-tacky and a combination thereof; and
generating a treated fluid having a level of the at least one contaminant and of the at least one corresponding modified contaminant to allow the treated fluid to at least meet requirements for release, reuse or further treatment,
wherein the at least one main off-gas is the contaminated off-gas,
wherein the at least one contaminant has a property selected from the group consisting or being volatile, hazardous, tacky and a combination thereof, and
wherein at least a portion of the treated off-gas is recycled to the contacting gas.

31. The process according to claim 30, wherein the at least one main off-gas is a plurality of main off-gas streams and wherein the plurality of main off-gas streams are combined to form the contaminated off-gas.

32. A method of treating a contaminated liquid having at least one contaminant having a property selected from the group consisting of being volatile, hazardous, tacky and a combination thereof, the method comprising:
contacting the contaminated liquid with an effective amount of an agent having ozone; partially oxidizing a portion of the at least one contaminant with the ozone to at least one corresponding modified contaminant having increased water salability, thereby increasing the contaminant carrying capacity of the contaminated liquid;

generating a treated fluid having a level of the at least one contaminant and of the at least one corresponding modified contaminant to allow the treated fluid to at least meet requirements for reuse as a metal finishing phosphating bath liquid, wherein the contaminated fluid liquid is a contaminated metal finishing phosphating bath liquid, wherein the ozone is added in an effective amount to also act as a phosphate-coating accelerator, a secondary phosphate-coating accelerator compound producer, phosphate-coating accelerator compound regenerator or combination thereof therein or as the phosphate coating accelerator, and wherein the at least one corresponding modified contaminant having increased water solubility increases the contaminant carrying capacity of the treated fluid.

* * * * *